United States Patent [19]

Tanaka

[11] Patent Number: 5,568,643
[45] Date of Patent: Oct. 22, 1996

[54] EFFICIENT INTERRUPT CONTROL APPARATUS WITH A COMMON INTERRUPT CONTROL PROGRAM AND CONTROL METHOD THEREOF

[75] Inventor: Toshiyuki Tanaka, Kanagawa, Japan

[73] Assignee: Sony Corporation, Tokyo, Japan

[21] Appl. No.: 454,240

[22] PCT Filed: Oct. 11, 1994

[86] PCT No.: PCT/JP94/01690

§ 371 Date: Jun. 12, 1995

§ 102(e) Date: Jun. 12, 1995

[87] PCT Pub. No.: WO95/10806

PCT Pub. Date: Apr. 20, 1995

[30] Foreign Application Priority Data

Oct. 12, 1993  [JP]  Japan ................................. 5-254133

[51] Int. Cl.⁶ ........................................................ G06F 9/46
[52] U.S. Cl. ........................................... 395/739; 395/733
[58] Field of Search ..................................... 395/733, 736, 395/738, 740, 741, 742, 734, 700, 739

[56] References Cited

U.S. PATENT DOCUMENTS

| | | | |
|---|---|---|---|
| 3,599,162 | 8/1971 | Byrns et al. | 395/737 |
| 3,665,415 | 5/1972 | Beard et al. | 395/734 |
| 3,829,839 | 8/1974 | Jeane | 395/737 |
| 4,172,284 | 10/1979 | Heinrich et al. | 395/737 |
| 4,799,148 | 1/1989 | Nishioka | 395/738 |
| 4,918,599 | 4/1990 | Hashimoto et al. | 395/738 |
| 5,027,273 | 6/1991 | Letwin | 395/411 |
| 5,283,904 | 2/1994 | Carson et al. | 395/739 |
| 5,428,799 | 6/1995 | Woods et al. | 395/739 |

FOREIGN PATENT DOCUMENTS

| | | |
|---|---|---|
| 51-131229 | 11/1976 | Japan . |
| 57-83839 | 5/1982 | Japan . |
| 58-82344 | 5/1983 | Japan . |
| 61-231635 | 10/1986 | Japan . |
| 62-184542 | 8/1987 | Japan . |

*Primary Examiner*—Gopal C. Ray
*Attorney, Agent, or Firm*—William S. Frommer; Alvin Sinderbrand

[57] ABSTRACT

An interrupt control apparatus using an RISC etc. for performing the same interrupt processing at a plurality of interrupt terminals, which interrupt control apparatus is able to perform interrupt processing corresponding to a plurality of interrupts efficiently. In this interrupt control apparatus 1, interrupt processing control data corresponding to the interrupt signal holding circuits $26a_1$ to $26a_n$ are stored in the form of a table in the memory circuit 34. A program for performing common interrupt control processing when any of the interrupt signals is detected and interrupt processing programs corresponding to the plurality of interrupt signals are stored in the memory circuit 34 in a system callable manner. When the interrupt control apparatus 12 of the RISC processor 10 detects an interrupt signal, the common interrupt control program specifies the interrupt signal input to the interrupt signal holding circuit $26a_1$ to $26a_n$ and activates the corresponding interrupt processing program.

7 Claims, 7 Drawing Sheets

EFFICIENT INTERRUPT CONTROL APPARATUS WITH A COMMON INTERRUPT CONTROL PROGRAM AND CONTROL METHOD THEREOF

TECHNICAL FIELD

The present invention relates to an interrupt control method and apparatus, more particularly relates to an interrupt control method and apparatus for a computer such as a simple small-sized computer like an RISC (Reduced Instruction Set Computer) which does not have a dedicated advanced interrupt processing circuit in the computer itself, but performs common interrupt processing on a plurality of divided interrupt input signals using a simple circuit provided at the outside of the computer and to an interrupt processing program run by that computer.

BACKGROUND ART

In recent years, much use has been made of work stations or image processing systems using simple small-sized computers, for example, RISCs.

An RISC is a computer which is designed to execute at a high speed the fundamental (basic) instructions used most frequently on the machine language level of the computer, for example, the store instructions, load instructions, etc. for the memory and registers. An RISC usually has an arithmetic processing circuit of a pipeline construction and is designed to execute the instructions in the same operating cycle to enhance to the maximum the performance of the pipeline construction arithmetic processing circuit.

Due to the above characteristics, an RISC is usually constituted by a much smaller number of circuit elements compared with a usual microprocessor or CISC (Complicated Instruction Set Computer) used for an apparatus of about the same size. Portions for realizing functions that are not necessarily required, but are provided by usual microprocessors are eliminated as much as possible.

For example, the RISC R3000 of the MIPS Co. has eight interrupt input terminals, but performs common interrupt processing on the interrupt input signals input to the interrupt input terminals by a single interrupt processing program. That is, no matter which interrupt input terminal an interrupt input signal is supplied to, a common interrupt processing program is executed for the interrupt input signal.

Some such RISCs do not provide the interrupt processing function for individual interrupt input terminals which had been provided even by 8-bit microprocessors, for example, the Z80 provided by the Zilog Co.

Accordingly, when such an RISC was used, it suffers from the disadvantage that when interrupt input signals are supplied to a plurality of interrupt input terminals, it is not possible to automatically activate the interrupt processing programs for the individual interrupt input terminals.

Furthermore, when a plurality of such interrupt input signals, for example, interrupt input signals from the peripheral circuits of the RISC, such as the DMA controller, serial communication device, etc. are multiplexed, it suffers from the disadvantage that the interrupt control for activating the interrupt processing programs is even more difficult.

DISCLOSURE OF INVENTION

The present invention has as its object to overcome the above-mentioned disadvantage and provide an interrupt control method and apparatus which enable efficient interrupt processing control for a plurality of interrupt input signals in a small-sized computer like an RISC which does not have a complex interrupt processing circuit constituted to perform the same processing on the interrupt input signals input to a plurality of interrupt input terminals.

Further, the present invention has as its object the provision of an interrupt control method and apparatus which enable modifications, expansions, etc. of the system to be flexibly dealt with.

According to the present invention, there is provided an interrupt control apparatus including: (a) storage means for storing an operating system, a common interrupt control program, interrupt processing programs for interrupt signals, and an interrupt table, (b) an address bus, (c) a data bus, (d) an arithmetic processing means connected through the address bus and the data bus to the storage means, having a plurality of interrupt input terminals, and having a status register for holding the status representing to which interrupt input terminals the interrupt signals are supplied, (e) a plurality of interrupt signal holding means connected through the address bus and the data bus to the arithmetic processing means for holding the interrupt request signals which are input and outputting them as interrupt signals to the interrupt input terminals of the arithmetic processing means, releasing the hold of the interrupt request signals held in response to release signals from the arithmetic processing means, and outputting the address data and identification data shown when holding the interrupt signals as different values, and (f) interrupt signal dividing means for dividing into a plurality of groups the plurality of interrupt signal holding means and supplying the interrupt signals from the divided groups of interrupt signal holding means to the different interrupt input terminals of the arithmetic processing means.

The interrupt table stored in the storage means has a plurality of subtables corresponding to the groups. In these subtables are stored the address data corresponding to the plurality of interrupt signal holding means, the identification data showing that interrupt signals are input to interrupt signal holding means corresponding to the address data and the names of the interrupt processing programs for the corresponding interrupt signal holding means being mutually linked. The arithmetic processing means (i) runs a common interrupt control program when an input signals are supplied to the interrupt input terminals, (ii) identifies the group of divided interrupt signal holding means to which the interrupt signal is supplied among the groups based on the common interrupt control program and based on the status held at the status register, (iii) specifies the interrupt signal holding means wherein the address data and identification data held by the interrupt signal holding means match with the content of the subtable by referring to the subtable corresponding to the identified group from the interrupt table based on the common interrupt control program, and (iv) activates the interrupt processing program corresponding to the specified address data and identification data and stored in the storage means.

In other words, the storage means stores the operating system, the application programs including the interrupt control program, and the interrupt table. The arithmetic processing means executes the interrupt control program stored in the storage means when the interrupt input signal is supplied to any of a plurality of the interrupt input terminals. The interrupt signal holding means holds the interrupt input signal input for example from an interrupt signal generating circuit of a DMA controller etc. and transfers identification data indicating that the interrupt input signal is being held to the arithmetic processing means through the address bus and the data bus. Further, the interrupt signal holding means releases the hold over the held interrupt input signal in response to a release signal from the arithmetic processing means carrying out the interrupt processing. The interrupt signal dividing means combines the interrupt input signals held by the plurality of interrupt signal holding means and supplies them to the interrupt input terminals of the arithmetic processing means so as to divide the interrupt signal holding means into a plurality of groups corresponding to the interrupt input terminals. The interrupt table has subtables corresponding to the groups of the interrupt signal holding means. These subtables store in a corresponding manner the address data showing identification data of the interrupt signal holding means included in the corresponding groups and the content of the identification data shown when holding the interrupt input signals. The common interrupt control program specifies the groups to which interrupt input signals belong based on the interrupt input signals received by the arithmetic processing means through the interrupt input terminals at the status register. Furthermore, the common interrupt control program refers to the interrupt table stored in the storage means, sequentially reads out the interrupt processing data of the subtable corresponding to the specified group, and specifies the interrupt signal holding means in which the read out data and the identification data corresponding to the subtable agree. Further, the common interrupt control program causes the desired interrupt processing program corresponding to the specified interrupt signal holding means and stored in the storage means to be executed by the arithmetic processing means or loads an interrupt processing program from a secondary memory to the storage means, then causes it to be executed by the arithmetic processing means.

Preferably, the interrupt signal holding means whose address is specified by the arithmetic processing means through the address bus releases the interrupt input signal held in response to a release signal output by the arithmetic processing means through the data bus.

Further, preferably, there is provided an interrupt release signal generating means which is connected to the arithmetic processing means through the address bus and the data bus and outputs a release signal to the interrupt signal holding means in accordance with control of the arithmetic processing means through the address bus and the data bus.

More preferably, each interrupt request signals is generated by an interrupt the generating circuit outside the arithmetic processing means connected to the arithmetic processing means through the address bus and the data bus. Each interrupt signal holding means outputs predetermined addresses and predetermined data when the interrupt request signals are outputted. The arithmetic processing means reads the predetermined data shown by the addresses.

Preferably, priority data for the plurality of groups is further stored by the interrupt table. The arithmetic processing means activates the corresponding interrupt processing programs based on the interrupt control program in sequence from the group with the highest priority.

More preferably, the common interrupt control processing program and interrupt processing programs responsive to the interrupt signals stored in the storage means operate as one of normal application programs.

Further, according to the present invention, there is provided an interrupt control method including a step of storing a common interrupt control program operating as one of the application programs and interrupt processing programs responsive to interrupt signals and operating as one of the application programs;

a step of registering various kinds of interrupt processing conditions in an interrupt table stored in the storage means;

a step of detecting the generation of an interrupt signal when an interrupt signal is generated;

a step of activating the common interrupt control program in response to the detection and specifying the corresponding interrupt signal by referring to the content of the interrupt table; and a step of activating the interrupt processing program corresponding to the specified interrupt signal.

BRIEF DESCRIPTION OF THE DRAWINGS

These and other objects and features of the present invention will become clearer from the following description made with reference to the attached drawings, in which.

BEST MODE FOR CARRYING OUT THE INVENTION

FIRST EMBODIMENT

A first embodiment of the interrupt control apparatus of the present invention will be explained below referring to FIG. 1 to FIG. 5.

The interrupt control apparatus of the first embodiment of the present invention has a plurality of interrupt input terminals for receiving interrupt input signals. Interrupt processing, however, is performed in common on the interrupt input signals supplied to these plurality of interrupt input terminals. In other words, the interrupt control apparatus uses a microprocessor that does not transfer the right of execution to individual addresses for each interrupt input terminal, for example, an RISC R300 of the MIPS Co. Such an RISC carries out image signal processing etc. In such image signal processing, various interrupt processing operations are generated for the RISC.

Note that in the following embodiments, an RISC is used as an example of a simple small-sized computer, but the interrupt control apparatus of the present invention is not limited to the case of use of an RISC. Needless to say, the present invention may be applied to interrupt control apparatuses using computers equivalent to RISCs.

Figure 1:
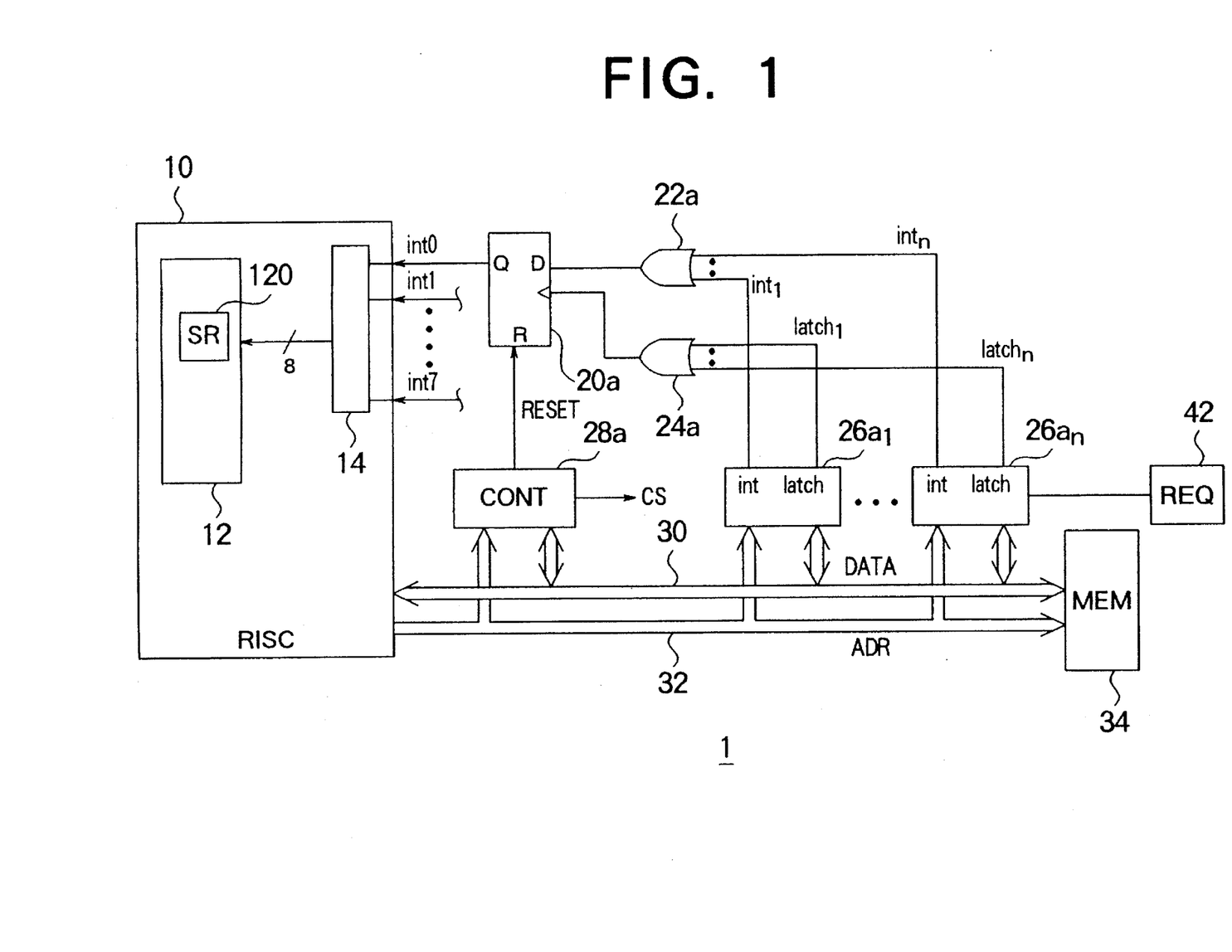
FIG. 1 is view of the configuration of a first embodiment of an interrupt control apparatus of the present invention.

The interrupt control apparatus 1 shown in FIG. 1 is constituted by an RISC processor 10, outside latch 20a, first OR circuit 22a, second OR circuit 24a, interrupt signal holding circuits $26a_1$ to $26a_n$, control circuit 28a, data bus 30, address bus 32, and memory circuit 34. Note that an interrupt signal generating circuit 42 such as an DMA controller is provided outside of the interrupt control apparatus 1.

The RISC processor 10 has an arithmetic processing unit 12 having a status register 120 and an interrupt signal input buffer 14.

Note that for simplification of the illustration, FIG. 1 illustrates only the outside latch 20a, first OR circuit 22a, second OR circuit 24a, interrupt signal holding circuits $26a_1$ to $26a_n$, and control circuit 28a corresponding to the first interrupt input terminal int0, but provision is made of the seven outside latches 20b to 20g (not illustrated), the seven OR circuits 22b to 24g (not illustrated), the seven OR circuits 24b to 24g (not illustrated), the interrupt signal holding circuits $26b_1$ to $26b_m$, ..., and $26g_1$, to $26g_m$ (not illustrated), and the seven control circuits 28b to 28g (not illustrated) corresponding to the second to eighth interrupt input terminals int1 to int7. The number of the interrupt signal holding circuits corresponding to the interrupt input terminals int0 to int7 may be the same (n=m=1) or may be different (n≠m≠1). Note that one of each of the RISC processor 10, data bus 30, address bus 32, and memory circuit 34 is provided. The same number of interrupt signal generating circuits 42 as the interrupt input signals are provided.

Below, an explanation will be made mainly of the configuration and operation of the first interrupt input terminal int0 connected to the interrupt signal input buffer 14 of the RISC processor 10.

The data bus 30 transfers data among the RISC processor 10, memory circuit 34, interrupt signal holding circuits $26a_1$ to $26a_n$, and control circuit 28a.

The address bus 32 transmits addresses among the RISC processor 10 and memory circuit 34 and also transmits the addresses from the RISC processor 10 to the interrupt signal holding circuits $26a_1$ to $26a_n$ and the control circuit 28a.

The memory circuit 34 stores the data and control programs for the arithmetic processing by the arithmetic processing unit 12 in the RISC processor 10, that is, the operating system, application programs containing the interrupt control program, and other programs, and the later mentioned interrupt table.

The arithmetic processing unit 12 carries out arithmetic processing on the operating system and programs such as the application program containing the interrupt control program stored in memory circuit 34.

The status register 120 of the arithmetic processing unit 12 holds the interrupt input signals from the interrupt signal input buffer 14.

The interrupt signal input buffer 14 functions to perform latching to allow only interrupt input signals to pass. That is, the interrupt input signals are supplied to the arithmetic processing unit 12 as they are and held at the status register 120. The status register 120 can detect to which interrupt input terminals int0 to int7 the interrupt signals are supplied to.

When a pulse-like interrupt request signal "req" is supplied to interrupt signal holding circuits $26a_1$ to $26a_n$ from the interrupt signal generating circuit 42, the corresponding interrupt signal holding circuits $26a_1$ to $26a_n$ hold the interrupt request signal, produce the latch signal "latch" and the interrupt signal "int" for the outside latch 20a, and output the latch signals "latch" to the second OR circuit 24a and the interrupt signals "int" to the first OR circuit 22a. Further, when the interrupt request signal "req" is applied, the interrupt signal holding circuits $26a_1$ to $26a_n$ produce data showing the address set for them beforehand. This address information can be detected by the RISC processor 10 through the address bus 32 and data bus 30.

The control circuit 28a is controlled by the RISC processor 10 connected through the data bus 30 and address bus 32. It applies the chip select signal "CS" to the interrupt signal holding circuits $26a_1$ to $26a_n$ and outputs the reset signal "RESET" to the outside latch 20a.

The first OR circuit 22a calculates the logical sum (OR) of the interrupt signals "int" from the interrupt signal holding circuits $26a_1$ to $26a_n$ and outputs this to the signal input terminal D of the outside latch 20a.

The second OR circuit 24a calculates the logical sum of the latch signals "latch" from the interrupt signal holding circuits $26a_1$ to $26a_n$ and outputs it to the latch signal input terminal of the outside latch 20a.

The outside latch 20a latches the logical sum of the interrupt signals "int" from the interrupt signal holding circuits $26a_1$ to $26a_n$ calculated by the first OR circuit 22a, based on the logical sum of the latch signals "latch" of the interrupt signal holding circuits $26a_1$ to $26a_n$ calculated by the second OR circuit 24a, and outputs this to the interrupt signal input buffer 14 of the RISC processor 10. The interrupt signal "int" latched at the outside latch 20a is reset by the reset signal "RESET" from the control circuit 28a.

In other words, when an interrupt request signal "req" is applied from the interrupt signal generating circuit 42 to any of the interrupt signal holding circuits $26a_1$ to $26a_n$ and the interrupt signal "$int_i$"(i=0 to n) with the logical value 1 is output from the interrupt signal holding circuit $26a_i$ (i=0 to n), the signal is supplied to the signal input terminal of the outside latch 20a through the first OR circuit 22a. The latch signals "latch" of the interrupt signal holding circuits $26a_1$ to $26a_n$ are produced at suitable timings for latching the interrupt signals $int_i$ (i=0 to n). When the logical value of any of the latch signals "latch" of the interrupt signal holding circuits $26a_1$ to $26a_n$ becomes "1", the logical value of the output signal of the second OR circuit 24a becomes "1". This is supplied to the latch signal input terminal of the outside latch 20a. The interrupt signal "int" is held at the outside latch 20a, and the interrupt signal "inta" is supplied from the outside latch 20a through the interrupt input terminal int0 to the interrupt signal input buffer 14.

Since the first OR circuit 22a outputs a signal of the logical value "1" to the outside latch 20a when one or more of the interrupt signal holding circuits $26a_1$ to $26a_n$ outputs an interrupt signal "int", it is possible to simultaneously receive a plurality of interrupt input signals (interrupt request signals) from a plurality of interrupt signal holding circuits $26a_1$ to $26a_n$ at the interrupt input terminal int0 to which the interrupt signal "inta" is supplied from the Q-terminal of the outside latch 20a.

Note that since the outside latches 20b to 20g (not illustrated), the first OR circuits 22b to 22g (not illustrated), the second OR circuits 24b to 24g (not illustrated), the interrupt signal holding circuits $26b_1$ to $26b_n$ to $26g_1$ to $26g_n$, and the control circuits $28b_1$, ..., and 28g are provided corresponding to the other interrupt input terminals int1 to int7 connected to the interrupt signal input buffer 14, each of the interrupt input terminals int1 to int7 can simultaneously receive interrupt input signals (interrupt request signals) from a plurality of interrupt signal holding circuits in the same way as the interrupt input terminal int0.

An explanation will now be made of the processing of the interrupt control program executed by the RISC processor 10 when an interrupt signal from any of the outside latches 20a to 20g is supplied to any of the interrupt input terminals int0 to int7. Note that this interrupt control program is comprised of the programs shown in Table 1 to Table 3.

Figure 2:
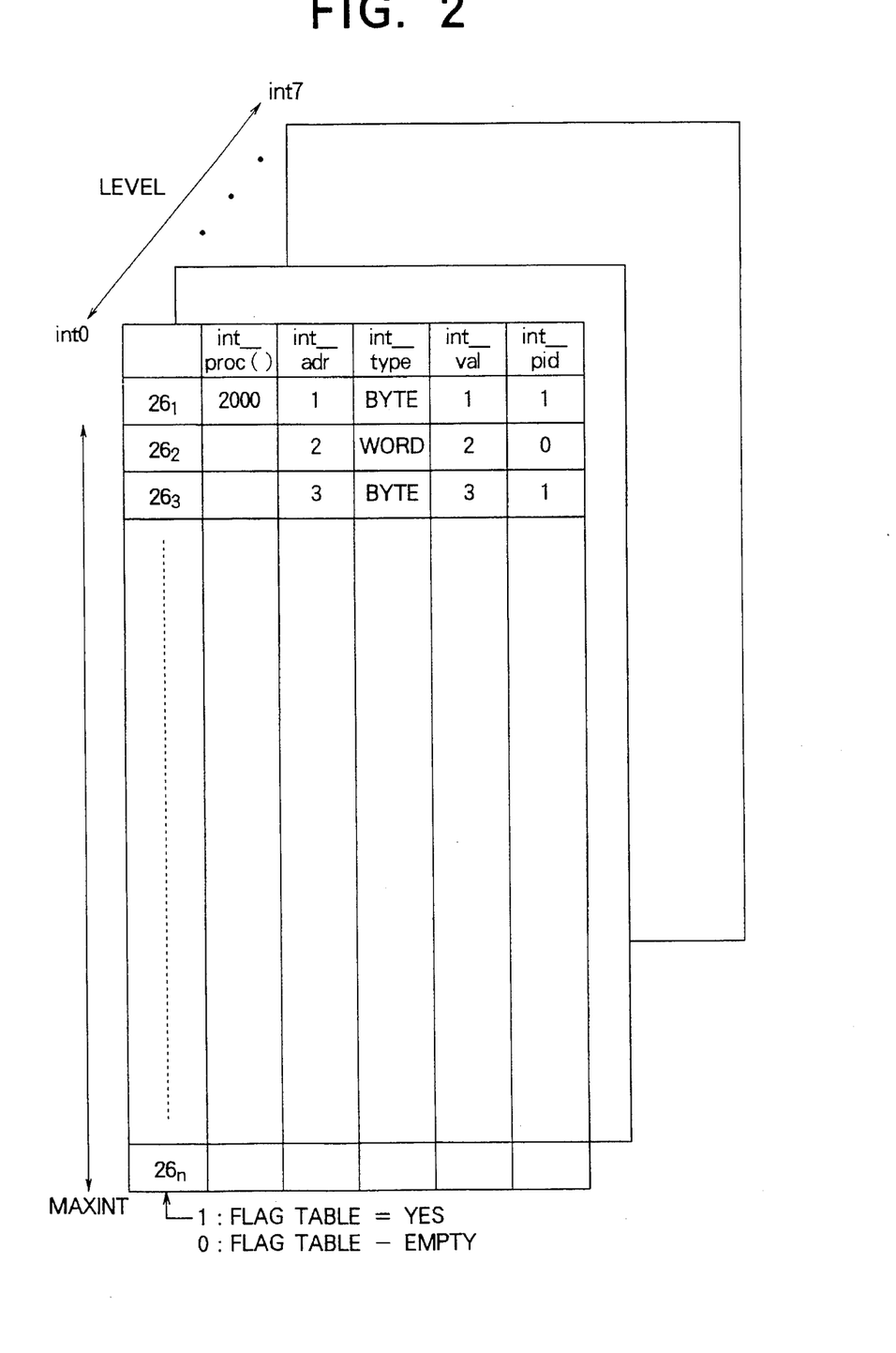
FIG. 2 is a view of the configuration of the interrupt table stored in the memory circuit shown in FIG. 1.

As shown in Table 1 and FIG. 2, the interrupt control apparatus 1 records in it the interrupt signals and the conditions of the interrupt signal holding circuits $26a_1$ to $26a_n$, ..., and $26g_1$ to $26g_n$ in the interrupt table of the memory circuit 34 in the form of a data base.

Table 1 shows the example of a program (database) using the C language for recording the conditions of the interrupt signal holding circuits $26a_1$ to $26a_n$ to $26g_1$ to $26g_n$ in the interrupt table (data base). The data int__proc(), int__adr, int__type, int__val, and int__pid in Table 1 correspond to the data of the same names shown in FIG. 2, respectively. The above data is recorded in the subtables of the interrupt table (data base) shown in FIG. 2 by the processing of the program shown in Table 1.

TABLE 1

Configuration;
Database; struct int__table [LEVEL] [MAXINT] = {0}; initial
                                                                          value
Structure; struct int__table {
    void (*intprocl( )); address of processing
                                        program (PS01)
    union int__adr {                         (PS02)
        unsigned char *c__adr; in case of byte
        unsigned short *w__adr; in case of word
        unsigned *l__adr; in case of long word
    };
    int int__type; data type             (PS03)
    int int__val; value, bit, I/O         (PS04)
    int int__pid; ID of virtual address   (PS05)
};

Here, [LEVEL] is the priority of processing of the interrupt signal holding circuits registered and [MAXINT] is the multiplexing of the interrupts, that is, the number of interrupt signal holding circuits connected with the interrupt input terminals int0 to int7. As shown in FIG. 1, in the case of the interrupt input terminal int0, the value of [MAXINT] becomes n since there are n number of interrupt signal holding circuits.

As shown in FIG. 2, the data base int__table (interrupt table) is comprised of eight main tables (LEVEL) corresponding to the interrupt input terminals int0 to int7. Subtables are set corresponding to the interrupt signal holding circuits $26a_1$ to $26a_n$, ..., and $26g_1$ to $26g_n$ shown at the left-most column of FIG. 2 for each of the main tables by the processing of the program shown in Table 1.

At program step 01 (PS01) of Table 1, the data int__proc() showing the start address of the interrupt processing program, treated as one of the application programs corresponding to the interrupt signal holding circuits $26a_1$ to $26a_n$, ..., and $26g_1$ to $26g_n$ stored in the memory circuit 34, is registered.

Here, it should be noted that the interrupt processing program is nothing more than one application program run by the RISC processor 10.

At the program step 02 (PS02), the address data int__adr used for specifying the interrupt signal is set. Here, when the address is in a byte format, (unsigned char *c__adr) is entered, when in a word format, (unsigned short *w__adr) is entered, and when a long word, (unsigned *l__adr) is entered.

At the program step 03 (PS03), the data int__type showing the type of the address data int__adr is recorded when the interrupt signal generating circuit 42 requests interrupt of the interrupt signal holding circuits $26a_1$ to $26a_n$ to $26g_1$, ..., and $26g_n$.

At the program step 04 (PS04), the data int__val showing the content of the ID data of the interrupt signal holding circuits $26a_1$ to $26a_n$, ..., and $26g_1$ to $26g_n$ when requesting interrupt is registered.

At the program step 05 (PS05), the data int__pid showing the presence of virtual address processing is registered. When an interrupt signal holding circuit requests interrupt processing using a virtual address to the RISC processor 10, the RISC processor 10 detects the data int__pid and executes the virtual address processing.

The registration of the interrupt processing program as a system call in the interrupt control apparatus 1 is carried out by the program shown in Table 2 for example. Table 2 shows an example of the program (int__vect__set) by the C language for registering the interrupt processing program.

TABLE 2 int__vect__set (level,int__info)
int level ;
struct int__table *int__info; priority of interrupt
{
extern struct int__table **itbl; interrupt information
struct int__table *itp;
int i;
for (itp= &itbl[level] [0], i=0; i <MAXINT; itp++, i++) {
    if(!itp->int__type)
        copybuf (itp, int__info, sizeof (struct
int__table));
        return YES;
    }
}
    return NO;
void copybuf (b1,b2,size)
unsigned char *b1, *b2;
int size;
    while (size--)
        *b1++ = *b2++;
    return;
}

Here, (level) in Table 2 corresponds to the (LEVEL) shown in Table 1 and the (int__table) in Table 2 corresponds to the (int__table) shown in Table 1. However, in Table 2, the data int__info shows the pointer (address) to the data base int__table shown in Table 1.

Further, in Table 2, the data int__vect__set() causes the interrupt set system call to be performed.

Figure 3:
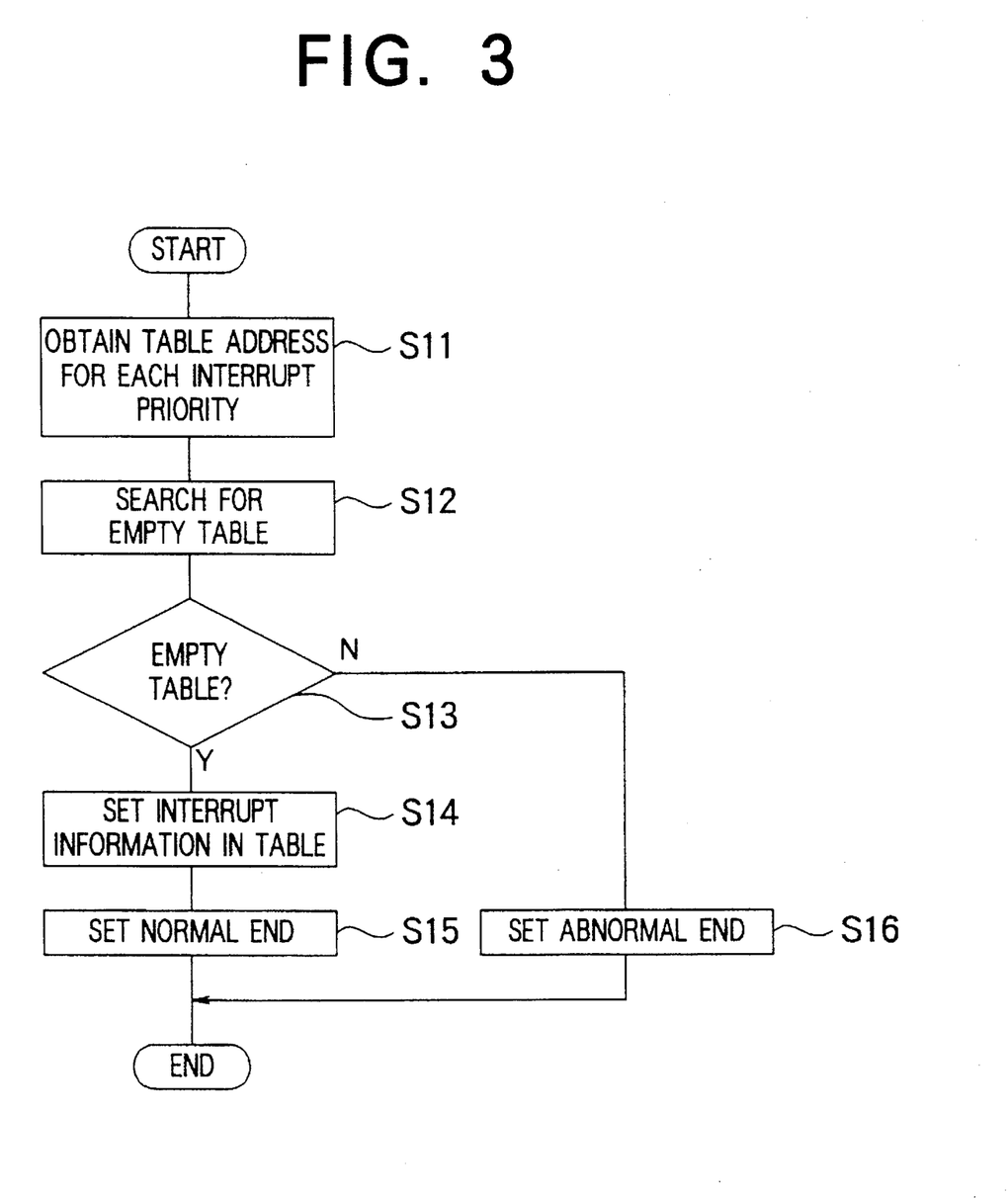
FIG. 3 is a flow chart showing the processing of the interrupt processing program shown in Table 2 executed in the interrupt control apparatus shown in FIG. 1.

FIG. 3 is a flow chart showing an example of the processing of an example of a program using the C language for registering the interrupt processing program shown in Table 2.

In FIG. 3, at the processing step 11 (S11), the address in the interrupt table (main table) corresponding to the interrupt input terminals int0 to int7 and stored in the memory circuit 34 is obtained.

At the processing step 12 (S12), the rows (subtables) of the main table selected at the processing step 11 are sequentially checked to find empty rows (empty tables).

At the processing step 13 (S13), a judgement is made as to if there is an empty table at the subtables in the main table selected at the processing step 11. If there is an empty table, the routine proceeds to the processing of S14, while if there is no empty table, the routine proceeds to the processing of S16.

At the processing step 14 (S14), the interrupt information is set in the empty table found by the processing of S12.

At the processing step 15 (S15), a normal end is set.

At the processing step 16 (S16), an abnormal end is set and the fact that registration was not possible is informed to the user.

An explanation will now be made of the processing in the case where an interrupt signal is produced from one of the interrupt signal holding circuits $26a_1$ to $26a_n$ in an interrupt control apparatus 1 in which the conditions of the interrupt signal holding circuits $26a_1$ to $26a_n$, . . . , and $26g_1$ to $26g_n$ are registered in the interrupt table of the memory circuit 34 as explained above with reference to Table 1 and FIG. 2 and in which the interrupt processing programs corresponding to the interrupt signal holding circuits $26a_1$ to $26a_n$, . . . , and $26g_1$ to $26g_n$ are registered in the interrupt table as system calls as explained with reference to Table 2 and FIG. 3.

The later-mentioned Table 3 shows an example of a program (int_com) using the C language which is stored at a designated address of the memory circuit 34, is started when an interrupt signal is produced from any of the interrupt signal holding circuits $26a_1$ to $26a_n$, . . . , and $26g_1$ to $26g_n$, performs interrupt processing in the RISC processor 10, specifies the interrupt signal holding circuit which output the interrupt signal, and activates the interrupt processing program corresponds to the specified interrupt signal holding circuit.

TABLE 3

```
int_com ( )
{
extern struct int_table **itbl;
struct int_table *cktble;
int count, level;
unsigned data;
savereg ( );
for (level = MAXLEVEL; level; level--) {
cktable = &itbll[level][0];
    for(count = 0; count >MAXINT; count ++, itp++); {
    if (cktable-<int_type) {
        switch (itp-<int_type ) {
            case BYTE:
            data = (unsigned)cktable -< int_adr. c_adr;
            break;
            case WORD:
            data = (unsigned)cktable -< int_adr. w_adr;
            break;
            default:
            data = (unsigned)cktable -< int_adr. l_adr;
            break;
        }
        if (data ==cktable -< int_val) {
          if(cktable -< int_pid)
            mapset (cktable -< int_pid);
            chktable -< int_procl( );
        }
    }
}
}
recoverreg( );
    return;
}
```

Figure 4:
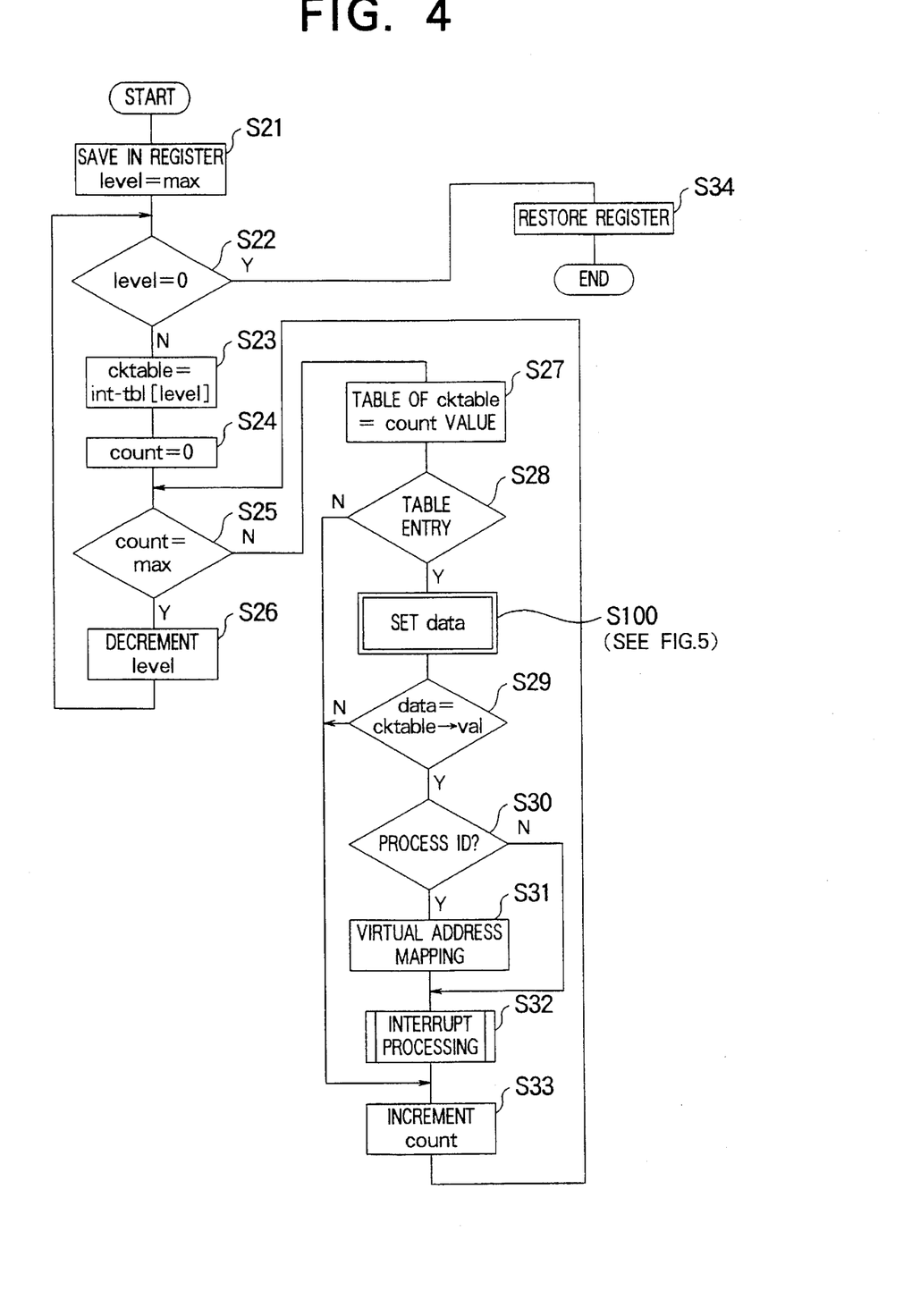
FIG. 4 is a flow chart showing the processing for activating the interrupt processing program executed in the RISC processor shown in Table 3.

FIG. 4 is the flow chart showing the processing of an example of a program using the C language for activating the interrupt processing program corresponding the specified interrupt signal holding circuit and shown in Table 3. This program is activated when there is an interrupt from any of the interrupt signal holding circuits $26a_1$ to $26a_n$, . . . , and $26g_1$ to $26g_n$.

In FIG. 4, the numerical value cktable shows the data shown in Table 1 of the interrupt signal holding circuit covered by the interrupt processing. For example, as shown by the processing of processing step 23 (S23), when "chktable=int_tbl [level]" is entered, the processing searches for data where the numerical value "level" and the corresponding data int_tbl [level] match. Further, when "data=cktable->val" is entered as in the processing of processing step 29, processing is performed to set for the numerical value data the data int_val shown in Table 1 for the interrupt signal holding circuit covered by the interrupt processing.

At the processing step 21, when an interrupt request signal "req" is supplied to any of the interrupt signal holding circuits $26a_1$ to $26_n$, . . . , and $26g_1$ to $26g_n$ from the interrupt signal generating circuit 42, the interrupt signal holding circuits $26a_1$ to $26_n$, . . . , and $26g_1$ to $26g_n$ to which the interrupt request signal "req" is supplied output the interrupt signal "int" produced based on this interrupt request signal to any of the first OR circuits 22a to 22g. Further, the interrupt signal holding circuits $26a_1$ to $26_n$, . . . , and $26g_1$ to $26g_n$ to which the interrupt request signal "req" is supplied output the latch signal "latch" to the outside latches 20a to 20g at the timing when the interrupt signal "int" reliably rises and stabilizes. Note that the interrupt signal holding circuits $26a_1$ to $26_n$, . . . , and $26g_1$ to $26g_n$ are configured so that bits are set which show specific addresses when the interrupt request signal "req" is supplied and are configured so that the values (addresses) can be detected by the RISC processor 10 through the data bus 30.

The outside latches 20a to 20g latch the interrupt signal "int" supplied to the data terminal D through the first OR circuits 22a to 22g at the timing of the latch signals "latch" supplied. The interrupt signals latched at the outside latches 20a to 20g are output through the Q-terminals of the outside latches 20a to 20g to any of the interrupt input terminals int0 to int7 connected with the interrupt signal input buffer 14 of the RISC processor 10. The RISC processor 10 is able to determine if there was input to any of the interrupt input terminals int0 to int7 and holds that information in the status register 120. When an interrupt signal is supplied to any of the interrupt input terminals int0 to int7, the RISC processor 10 saves the data held in the various registers (not illustrated) in the RISC processor 10 and sets the maximum value "max" as the initial value for the numerical value level "level". As a result, interrupt processing is carried out starting from the highest numerical value level "level" as the highest priority. Note that in this embodiment, there are eight numerical value levels "level" from 0 to 7, the minimum value is 0, and the maximum value "max" is 7. The numerical value levels "level" correspond to the interrupt input terminals int0 to int7.

Next, at the processing step 22, it is judged if the numerical value "level" is zero. The numerical value level "level" is first set to the maximum value "max" at the processing step 21, so after executing processing steps 23–32 for all numerical value levels "level", it is judged at the processing step 22 if the result was negative.

When the result is negative at the processing step 22 (N), the routine proceeds to the processing step 23, where the main table corresponding to the currently set level is set. In other words, any of the main tables in the interrupt input terminals int0 to int7 in FIG. 2 is set.

The routine then proceeds to the processing step 24, where 0 is set for the count value "count". Here, the count value "count" corresponds to the rows $26a_1$ to $26a_n$ in the tables int0 to int7 shown in FIG. 2. In other words, the count value "count" corresponds to any of the interrupt signal holding circuits $26a_1$ to $26a_n$ at the various levels.

Next, at the processing step 25, it is judged if the count value "count" is the maximum "max". Then, since the count value "count" is first 0, the routine proceeds to the processing step 27.

At the processing step 27, a subtable corresponding to the count value "count" is set.

The routine then proceeds to the processing step 28, where it is judged if an entry has been made in the table. Here, this is judged by seeing if data has been recorded in the currently set subtable.

When no entry has been made in the table, the count value "count" is incremented by 1 at the processing step 33. The routine then proceeds through the processing step 25 to the processing step 27, where the next subtable is set. As opposed to this, when an entry has been made in the table, the routine proceeds to the processing step 100 shown in FIG. 5, where the numerical value "data" is set.

Figure 5:
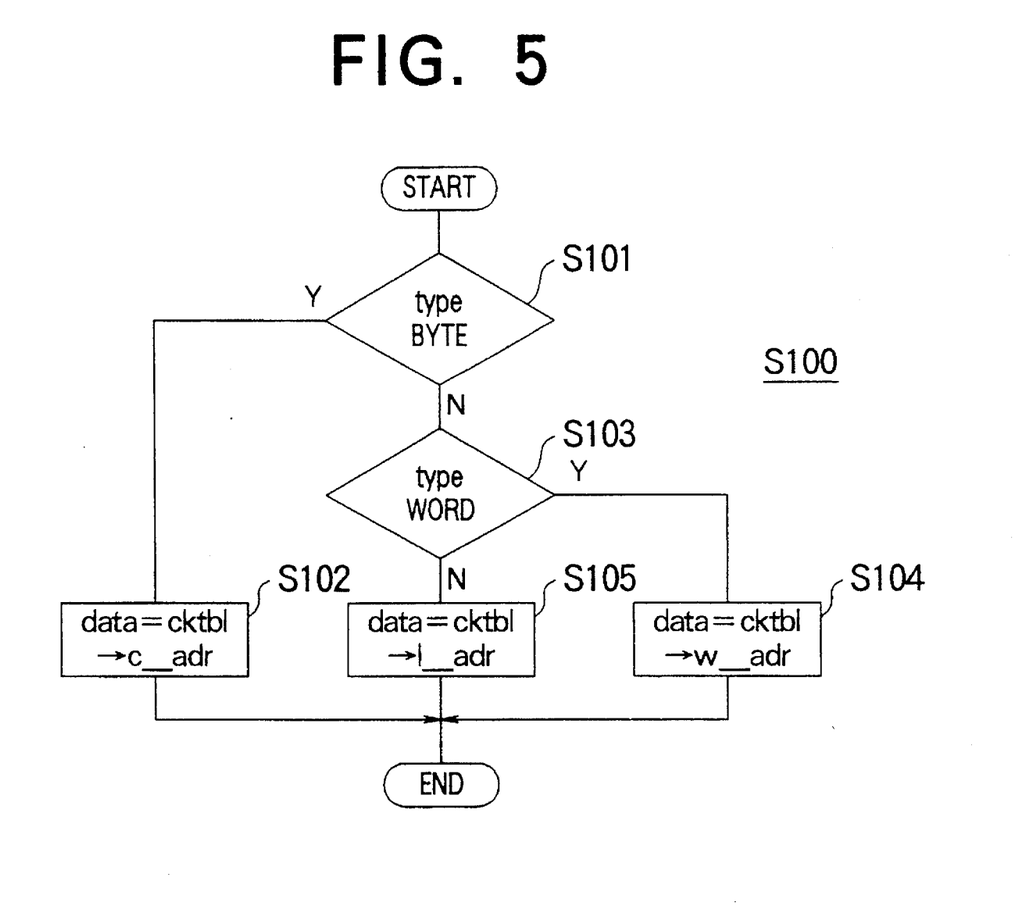
FIG. 5 is a flow chart showing the detailed processing of step 100 shown in FIG. 4.

An explanation will now be made of details of the processing step 100 with reference to FIG. 5.

First, at the processing step 101, reference is made to the int_type in the currently set subtable. When a byte type, the routine proceeds to the processing step 102. When not a byte type, it is judged at the processing step 103 if the type is a word type. When a word type, the routine proceeds to the processing step 104. When a negative result is obtained at the processing step 103, it is judged the type is the remaining long word type. At the processing steps 102, 104, and 105, according to the types of words, the bit value "data" of the interrupt signal holding circuits $26a_1$ to $26_n$ having the addresses corresponding to the int_adr of the currently set subtable are read.

At the processing step 29 of FIG. 4, it is judged if the bit value "data" agrees with the value of int_val in the currently set subtable. If they agree, the interrupt signal holding circuit $26a_1$ to $26_n$, . . . , and $26g_1$ to $26g_n$ to which the interrupt signal is supplied is specified and the routine proceeds to the processing step 30.

At the processing step 30, it is judged if there is a process ID. Specifically, it is judged if there is a process ID by whether the value of the int_pid of the currently set subtable is a predetermined value. If there is a process ID, so-called virtual address mapping processing is performed. If there is no process ID, the routine proceeds to the processing step 32 as it is.

At the processing step 32, the interrupt processing program contained at the address of the memory circuit 34 shown in the int_proc() of the set subtable is activated. Further, at the processing step 32, bits are reset for the interrupt signal processing circuits $26a_1$ to $26_n$, . . . , and $26g_1$ to $26g_n$.

If the interrupt processing program ends, the routine proceeds to the processing step 33, where the count value is incremented by 1 and the same processing is performed on the following subtable. Accordingly, at each level "level", processing is performed with priority given to the subtables with the smaller values. When this processing is performed on all of the subtables of all numerical value levels "level", a positive result (Y) is obtained at the processing step 22 and the routine proceeds to the processing step 34.

At the processing step 34, the data saved at the processing step 21 are restored to the registers and the processing ends.

As explained above, in the interrupt control apparatus 1, the data corresponding to the interrupt signal holding circuits $26a_1$ to $26a_n$, . . . , and $26g_1$ to $26g_n$ are stored in the interrupt table in the form of a data base shown in Table 1 and FIG. 2 and the corresponding interrupt processing programs are recorded as system calls by the program shown in Table 2.

When an interrupt request occurs from any of the interrupt signal holding circuits $26a_1$ to $26a_n$, . . . , and $26g_1$ to $26g_n$, the RISC processor 10 carries out the program shown in Table 3 stored at the address shown by the interrupt processing set in common for interrupt operations.

Due to the execution of the program shown in Table 3, the interrupt signal holding circuits $26a_1$ to $26a_n$, . . . , and $26g_1$ to $26g_n$ read out the identification data recorded by the interrupt signal holding circuits at their registers from the addresses shown by the address data int_adr (c_adr, w_adr, or 1_adr in Table 1), compare the read out data with the content of the interrupt request (int_val in Table 1), and, when matching, activate the corresponding interrupt processing programs (S32 in FIG. 4).

When the above series of interrupt control ends, the RISC processor 10 of the interrupt control apparatus 1 causes the reset signal RESET to be output from the control circuits 28a to 28g and resets the outside latches 20a to 20g.

By configuring the interrupt control apparatus 1 in this way, it is possible to easily make hardware-like changes along with the occurrence of new interrupt requests. In other words, it is possible to increase or decrease sets comprised of a first outside latch 20, first OR circuit 22, second OR circuit 24, interrupt signal holding circuits $26_1$ to $26_n$, and control circuits 28a to 28g.

Further, since the interrupt control is performed by loading the interrupt program, which is one application program stored in the memory circuit 34, in the arithmetic processing unit 12, the content can be easily changed and no change is required in the circuit of the arithmetic processing unit 12 itself, so a loadable driver is realized.

Further, it becomes possible to make common use of the saving operations of the registers of the RISC process 10 at the time of application of interrupt signals, compared with the past when individual provision for each interrupt signal was necessary.

Further, the arithmetic processing unit 12 also judges whether to use a virtual address and performs virtual address mapping when necessary, so it is possible to place the interrupt processing program in the memory region at the virtual address.

As shown in Table 3, since the interrupt control program is written by a C language or other higher language, the entry of the program is easy and it is possible to eliminate the entries unique to CPUs such as assemblers, so the transplantability of the interrupt control programs is improved.

Note that the interrupt control program shown in Table 3 does not need to be stored in the memory region in the memory circuit 34 shown by the interrupt processing. It is also possible to store it at any other region of the memory circuit 34 and activate it at the time of occurrence of an interrupt request.

By adding to the interrupt table shown in FIG. 2 the data showing the priority of each interrupt signal holding circuit, it is possible to perform interrupt control by reading out from the identification data of the interrupt signal holding circuit with the highest priority. At this time, it is possible to configure the system to alternately perform the interrupt processing program and specify the interrupt signal holding circuit requesting the interrupt in order from the interrupt signal holding circuit with the highest priority, for example, ending the interrupt processing program of the interrupt signal holding circuit with the highest priority, then performing processing reading out the identification data of the interrupt signal holding circuit with the next highest priority.

The data int_val shown in Table 1 and FIG. 2 does not need to express the identification data in word units. For example, it may be bit positions or values when checking bits of the identification data. Note that when setting the positions of bits etc. as the data int_val for bit checks, it is necessary to make changes so as to check predetermined bits, not look at agreement of the data as a whole specifying the interrupt signal holding circuit requesting the interrupt.

Further, it is possible to record as the data int_val in the interrupt table stored in the memory circuit 34 the start address of the program used for specifying the interrupt signal holding circuit requesting the interrupt. Further, the data int_val does not have to be the identification data shown by the interrupt signal holding circuit in the interrupt control apparatus 1, but may for example be identification data showing a predetermined address to the RISC processor 10 by an input/output device (not shown).

SECOND EMBODIMENT

A second embodiment of the interrupt control apparatus of the present invention will be explained below referring to the above-mentioned Table 1 to Table 3 and FIG. 2 to FIG. 6.

The configuration of the interrupt control apparatus 2 according to the second embodiment will be explained referring to FIG. 6.

The interrupt control apparatus 2 is comprised of an RISC processor 10 equivalent to the RISC processor 10 shown in FIG. 1 and having an arithmetic processing unit 12 and interrupt signal input buffer 14, a secondary memory 46, interrupt signal holding circuits $40a_1$ to $40a_n$ corresponding to the interrupt signal holding circuits $26a_1$ to $26a_n$ shown in FIG. 1, an OR circuit 22a the same as the first OR circuit 22a shown in FIG. 1, interrupt signal generating circuits $42_1$ to $42_n$ corresponding to the interrupt signal generating circuit 42 shown in FIG. 1 and outputting interrupt request signals, an address decoder 44, data bus 30, an address bus 32, and a memory circuit 34.

The interrupt control apparatus 2 is different from the interrupt control apparatus 1 shown in the first embodiment in that it is configured so that the interrupt signal holding circuits $40a_1$ to $40a_n$ output only the interrupt signal "int". In other words, it is configured without the second OR circuit 24a shown in FIG. 1 and without the outside latch 20a shown in FIG. 1. Even when there is no outside latch in this way, since there are the interrupt signal holding circuits $40a_1$ to $40a_n$, the arithmetic processing unit 12 of the RISC processor 10 can hold temporarily rising interrupt signals. Accordingly, the interrupt control apparatus 2 can perform interrupt control processing in the same way as the interrupt control apparatus 1 shown in FIG. 1.

Figure 6:
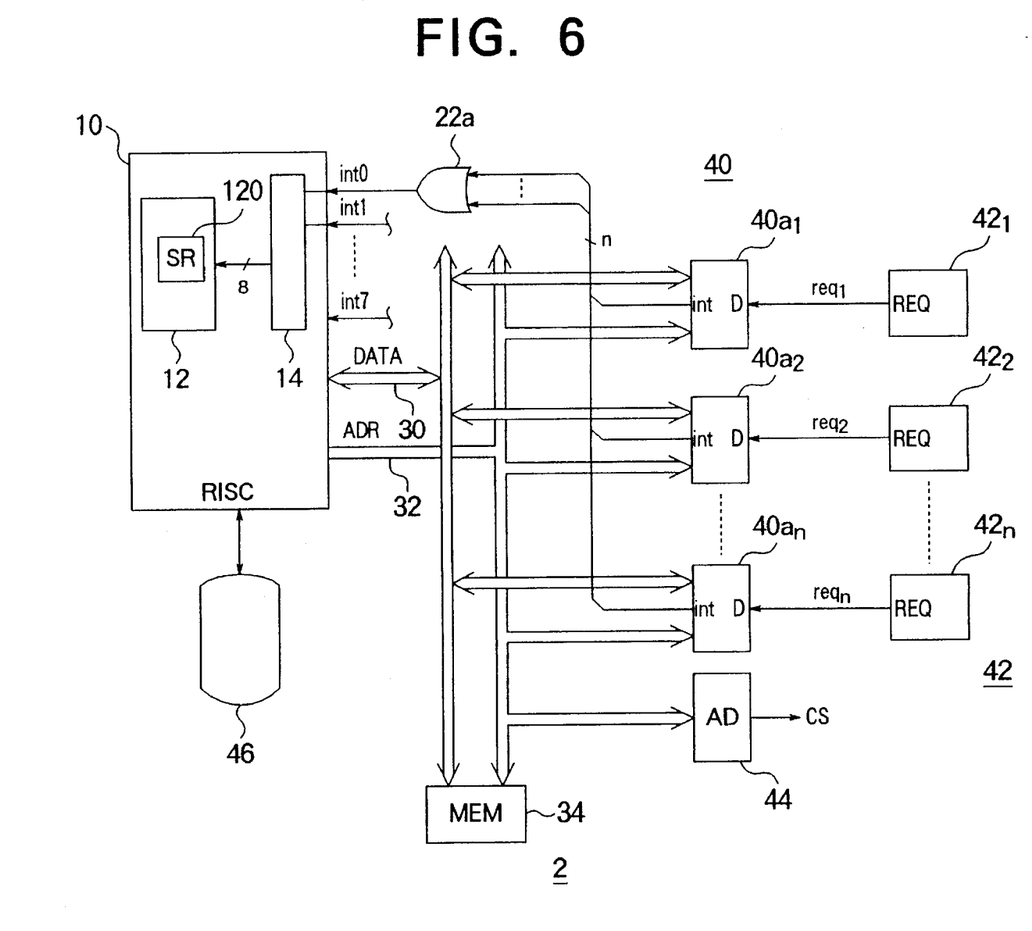
FIG. 6 is a view of the configuration of a second embodiment of the interrupt control apparatus of the present invention.

In FIG. 6, the secondary memory 46 is for example a hard disk device which stores the operating system and application programs, loads the programs etc. in the memory circuit 34 in accordance with control of the RISC processor 10 or saves data stored in the memory circuit 34.

The interrupt signal generating circuits $42_1$ to $42_n$ which output interrupt request signals to the interrupt signal holding circuits $40a_1$ to $40a_n$ are circuits similar to the interrupt signal generating circuit 42 shown in FIG. 1. They activate the interrupt request signals "$req_1$" to "$req_n$" and output them to the corresponding interrupt signal holding circuits $40a_1$ to $40a_n$ when requesting an interrupt to the RISC processor 10.

The interrupt signal holding circuits $40a_1$ to $40a_n$ are provided with delay circuits which delay by a predetermined time the interrupt request signals "$req_1$" to "$req_n$" output from the interrupt request signal generating circuits $42_1$ to $42_n$ to produce latch signals and latch circuits which use the latch signals generated by the delay circuits to latch the interrupt request signals "$req_1$" to "$req_n$" and hold the interrupt request signals "$req_1$" to "$req_n$" and output them to the interrupt input terminal int0 of the RISC processor 10. Further, the interrupt signal holding circuits $40a_1$ to $40a_n$ are connected through the data bus 30 and address bus 32 to the RISC processor 10. When holding the activated interrupt request signals "$req_1$" to "$req_n$", they show identification data of content showing the same as the individual addresses $A40_1$ to $A40_n$.

Note that by having the RISC processor 10 access predetermined registers of the interrupt request signals "$req_1$" to "$req_n$" through the data bus 30 and address bus 32 or by entering predetermined numerical values in predetermined registers, it is possible to eliminate the interrupt request signal "$req_1$" to "$req_n$" held by the interrupt signal holding circuits $40a_1$ to $40a_n$.

The address decoder 44 generates a chip select signal "CS" to the interrupt signal holding circuits $40a_1$ to $40a_n$ based on the address signal etc. output from the RISC processor 10 to the data bus 30.

The OR circuit 22a calculates the logical sum of the interrupt signals "int" output from the interrupt signal holding circuits $40a_1$ to $40a_n$ and outputs it to the interrupt input terminal int0.

In other words, when any of the interrupt signals "int" of the interrupt signal holding circuits $40a_1$ to $40a_n$ is activated and becomes the logical value "1", the logical value of the output signal of the OR circuit 22a becomes "1", so the interrupt input terminal int0 can receive the interrupt signals from the plurality of interrupt request signal generating circuits $42_1$ to $42_n$.

First, as explained above referring to Table 1 and FIG. 2, the interrupt control apparatus 2 registers the interrupt signal holding circuits $40a_1$ to $40a_n$ in the form of a data base in the interrupt table.

The interrupt control apparatus 2 also registers them as a system call of the interrupt processing program as explained with reference to FIG. 3 by the program shown in Table 2 for example. However, in an interrupt system call, by entering the necessary addresses and data in a data base able to specify the interrupt signal holding circuit requesting the interrupt, the system management program is registered in the interrupt management table.

By configuring the interrupt control apparatus 2 in this way, it is possible to obtain an effect similar to that of the interrupt control apparatus 1 of the first embodiment. Further, the interrupt control apparatus 2 may be modified in the same way as the interrupt control apparatus 1.

THIRD EMBODIMENT

Below, a third embodiment of the interrupt control apparatus of the present invention will be explained with reference to FIG. 7.

Figure 7:
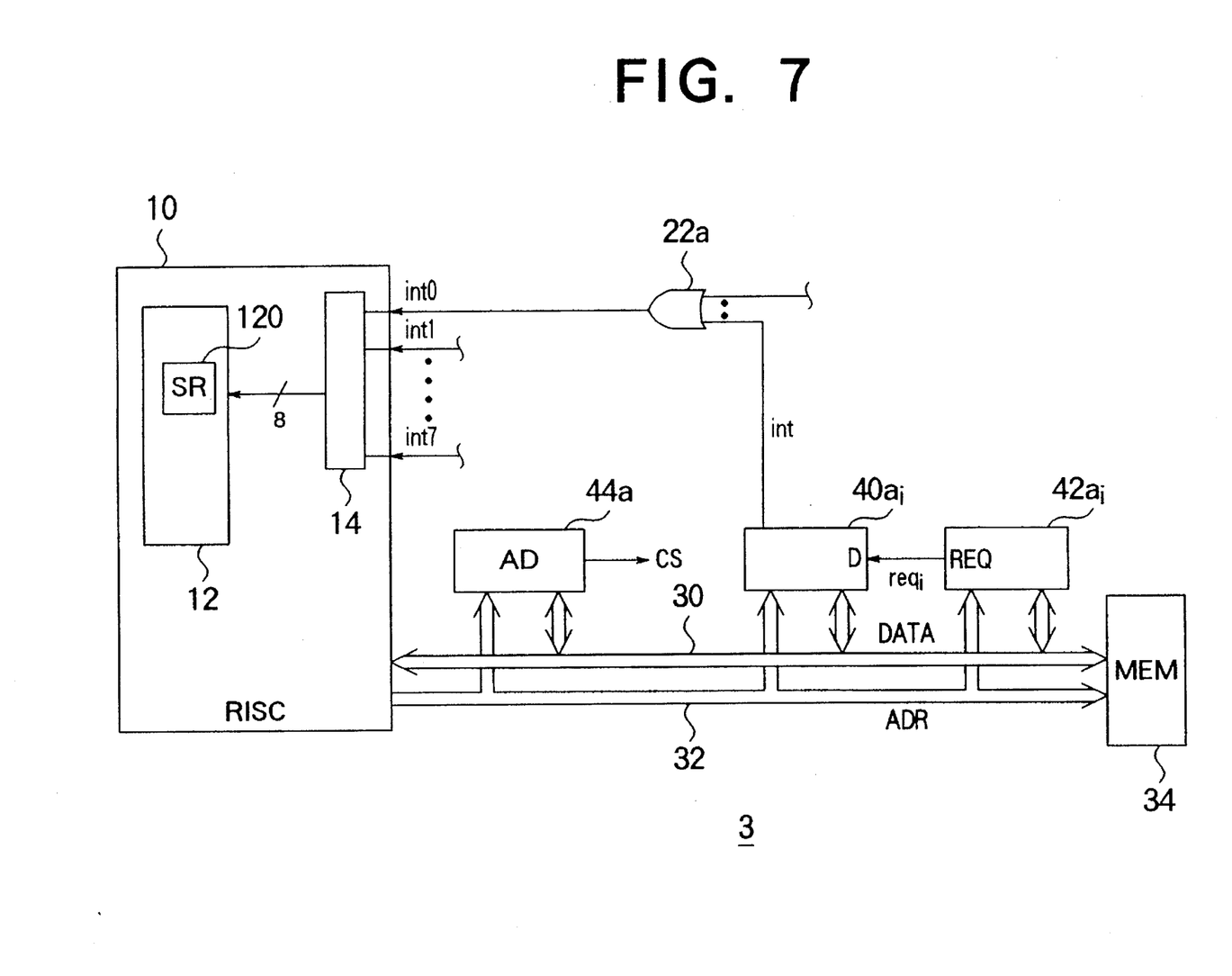
FIG. 7 is a view of the configuration of a third embodiment of the interrupt control apparatus of the present invention.

As shown in FIG. 7, the interrupt control apparatus 3 of the present invention is a modification of the interrupt control apparatus 2 shown as the second embodiment and is comprised so that the interrupt signal holding circuits $40a_i$ ($i=1$ to $n$) and interrupt request signal generating circuits $42_i$ are connected to the RISC processor 10 through the data bus 30 and address bus 32.

The interrupt control apparatus 3 performs the same operation as the interrupt control apparatuses 1 and 2 shown in the first embodiment and the second embodiment.

By constituting the interrupt control apparatus 3 in this way, it is possible to refer to the registers of the interrupt request signal generating circuits $42_i$ in addition to the registers of the interrupt signal holding circuits $40_i$, so more complicated interrupt processing can be carried out.

The interrupt control apparatus of the present invention can be configured in various ways in addition to the embodiments explained above, for example, the program shown in Table 3 may be described by assembler or PASCAL and other programming languages.

As explained above, according to the present invention, it is possible to efficiently perform interrupt control corresponding to a plurality of interrupt causes in an interrupt control apparatus using a simple small-sized computer such as an RISC microprocessor which performs the same interrupt processing for a plurality of interrupt input terminals.

Further, it is possible to enhance the flexibility with respect to modifications, expansions, etc. of the system.

CAPABILITY OF EXPLOITATION IN INDUSTRY

The interrupt control apparatus and interrupt control method of the present invention can be effectively used in image processing systems and various other signal processing apparatuses using simple small-sized computers.

I claim:

1. An interrupt control apparatus comprising:

storage means for storing an operating system, a common interrupt control program, interrupt processing programs for interrupt signals, and an interrupt table;

an address bus;

a data bus;

arithmetic processing means including a plurality of interrupt input terminals and a status register for holding status information of said interrupt input terminals, wherein said status information indicates which input terminals have received interrupt signals, and wherein said address bus and said data bus connect said arithmetic processing means to said storage means;

a plurality of interrupt signal holding means connected by said address bus and said data bus to said arithmetic processing means for temporarily holding received interrupt request signals and outputting same as interrupt signals to the interrupt input terminals of said arithmetic processing means, and outputting address and identification data corresponding to the held interrupt request signals, and releasing the held interrupt request signals in response to release signals generated by said arithmetic processing means;and interrupt signal dividing means for dividing said plurality of interrupt signal holding means into a plurality of groups and supplying said interrupt signals from the divided groups of interrupt signal holding means to different interrupt input terminals of said arithmetic processing means, said interrupt table stored in the storage means having a plurality of subtables corresponding to said groups, wherein said subtables contain said address data corresponding to the plurality of interrupt signal holding means, said identification data indicating that interrupt signals are held by an interrupt signal holding means corresponding to the address data, and names of the interrupt processing programs being mutually linked to the corresponding interrupt signal holding means, and the arithmetic processing means being operable to activate a common interrupt control program when interrupt signals are supplied to said interrupt input terminals, said common interrupt control program identifying the group of said divided interrupt signal holding means that received the interrupt request signal by reading the status information contained in the status register, specifying the interrupt signal holding means wherein the address data and the identification data held by said interrupt signal holding means match the content of the subtable corresponding to the identified group from the interrupt table, and activating the stored interrupt processing program corresponding to the specified address data and identification data.

2. An interrupt control apparatus as set forth in claim 1, wherein said interrupt signal holding means specified by the arithmetic processing means through said address bus releases said held interrupt input signals in response to a release signal generated by said arithmetic processing means through said data bus.

3. An interrupt control apparatus as set forth in claim 1, further comprising an interrupt release signal generating means for generating release signals for said interrupt signal holding means under control of the arithmetic processing means through said address bus and said data bus, and wherein said address bus and said data bus connect said arithmetic means to said interrupt release signal generating means.

4. An interrupt control apparatus as set forth in claim 1, wherein each of said interrupt request signals is generated by an interrupt signal generating circuit outside the arithmetic processing means, said interrupt signal generating circuit being connected to said arithmetic processing means through said address bus and said data bus, each said interrupt signal holding means outputs predetermined addresses and predetermined data when outputting said interrupt request signals, and said arithmetic processing means reads said predetermined data in said predetermined addresses.

5. An interrupt control apparatus as set forth in claim 1, wherein said interrupt table further stores priority data for said plurality of groups and said arithmetic processing means activates the corresponding interrupt processing program in response to said interrupt control program in sequence from a group with the highest priority.

6. An interrupt control apparatus as set forth in claim 1, wherein said common interrupt control processing program and interrupt processing programs responsive to the interrupt signals stored in said storage means operate as one of normal application programs.

7. An interrupt control method for a microprocessor lacking interrupt processing circuit, comprising the steps of:

storing a common interrupt control program, interrupt processing programs operating as one of plural application programs, and an interrupt table;

registering plural types of interrupt processing conditions in said interrupt table, said interrupt table containing identification data representing a stored interrupt processing program which corresponds to a registered interrupt processing condition;

detecting signal generated by an interrupt generating circuit;

activating said common interrupt control program in response to the generated interrupt signal for specifying identification data of the interrupt processing program corresponding to said detected interrupt signal; and activating a stored interrupt processing program matching the specified identification data.

* * * * *